Nov. 20, 1962 H. C. TALCOTT 3,065,307

ELECTRONIC TELEPHONE SYSTEMS AND RINGING ARRANGEMENTS THEREFOR

Filed Oct. 12, 1959

6 Sheets-Sheet 1

INVENTOR.
Horace C. Talcott

BY C. A. Gulbrandsen

Att'y

Nov. 20, 1962 H. C. TALCOTT 3,065,307

ELECTRONIC TELEPHONE SYSTEMS AND RINGING ARRANGEMENTS THEREFOR

Filed Oct. 12, 1959

6 Sheets-Sheet 2

Nov. 20, 1962 H. C. TALCOTT 3,065,307

ELECTRONIC TELEPHONE SYSTEMS AND RINGING ARRANGEMENTS THEREFOR

Filed Oct. 12, 1959 6 Sheets-Sheet 6

United States Patent Office 3,065,307
Patented Nov. 20, 1962

3,065,307

ELECTRONIC TELEPHONE SYSTEMS AND RINGING ARRANGEMENTS THEREFOR

Horace C. Talcott, Downers Grove, Ill., assignor to Automatic Electric Laboratories, Inc., a corporation of Delaware Filed Oct. 12, 1959, Ser. No. 845,802
6 Claims. (Cl. 179—18)

This invention relates to ringing arrangements, and more particularly to tone ringing arrangements. The invention is applicable, for example, to time division multiplex telephone systems such as the one disclosed in the United States patent application Serial No. 843,380 by A. H. Faulkner and D. K. Melvin, filed September 30, 1959, now Patent 3,015,699 issued January 2, 1962.

The advent of electronic telephone systems brought about a need for a new type of subscriber's substation, particularly, a new type of ringing arrangement therefor. Since the design of these systems has been concentrated upon handling speech signals of the order of a volt or a milliwatt, the relatively large currents and voltages required by the conventional ringers of the past are not compatible and represent formidable design difficulties.

It is therefore the principal object of this invention to provide a new and improved ringing arrangement for use in telephone systems, particularly of the electronic type.

In an electronic telephone system as described in the above-mentioned patent application by Faulkner et al., there are several basic problems involving general functions which take place in the substation, line circuit and certain common equipment.

For example, the insertion of a resistor in the battery feed circuit of an electronic telephone system has been almost universally accepted as a means for loop supervision of the subscriber's lines. If, however, the substation is a two-wire device the power for ringing as well as that for supervision and dialling must be delivered over the same two wires. This presents a problem when it is necessary to cut off ringing since the loop supervisory signal is needed to cut off the ringing and to switch through to provide voice transmission. The invention overcomes this difficulty.

According to its principal aspect, the invention consists in a ring control unit located in the central office line circuit which reverses the direction of direct current flow from the source over the line when the line circuit is seized by an incoming call. A tone ringer at the subscriber substation responds to the reversals to signal the called subscriber at the substation.

In this connection, it is a further object of this invention to provide a ringing arrangement having new and improved means for disabling the loop supervisory circuit during ringing, and for cutting off the ringing and for switching through to provide voice transmission.

Preferably, although not necessarily, the ringing tone is generated in every substation, in response to the above-mentioned reversals at the central office.

In the embodiments of the invention described below, the ringing generator is located in the subscriber's substation and is at the same time direct current supplied and triggered by the reversals of the direction of the direct current flow supplied by the central office. Large amounts of power can be sent over the line because the energy is in the form of low frequency direct-current pulses. In view of this, the acoustic design of the ringing transducer need not be critical and a simple transistor oscillator will suffice as a generator.

The tone ringer as disclosed in one embodiment of this invention comprises a relaxation type of oscillator triggered when the direction of direct-current flow over the line is reversed. A transducer at the substation reproduces the audio signal generated by the oscillator to signal the called subscriber at the substation.

The ring control unit as disclosed in this embodiment comprises a static bistable device controlling both sides of the telephone line as a function of control signals derived directly from the multiplex logic. When the line circuit is seized by an incoming call, the direction of direct current flow over the line is reversed to trigger the tone ringer at the substation.

According to a second embodiment of this invention, the tone ringer at the substation comprises a self-quenching Colpitts type oscillator triggered when the direction of direct current flow over the line is reversed. The audio signal generated by the oscillator is reproduced by a transducer to signal the called subscriber at the substation.

The ring control unit disclosed in this second embodiment comprises a static bistable device controlling the direct-current potential applied to one side of the telephone line as a function of ring tone control signals received over the common multiplex transmission highway. When the line circuit is seized by an incoming call, the polarity of this potential is reversed to trigger the tone ringer at the substation.

A third, and the preferred embodiment of this invention discloses the tone ringer of the first embodiment controlled by means of the ring control unit of the second embodiment modified to perform the necessary operations in conjunction with the above-mentioned tone ringer.

The invention, both as to its organization and method of operation, together with other objects and features thereof not specifically mentioned, will best be understood by reference to the following specification taken in connection with the accompanying drawings.

In these drawings:

FIG. 1 is a single line block diagram of the entire system, with the two ferrite-core memories shown schematically;

FIGS. 2 and 3, when arranged as shown in FIG. 9, comprise a diagram showing the interconnections of several of the various units, with line circuits shown by schematic and block diagrams in FIG. 2 and the transmission circuits shown by block diagrams in FIG. 3;

FIGS. 4 and 5, when arranged as shown, comprise a ringing arrangement disclosed as one embodiment of this invention, with the subscriber's telephone substation shown schematically in FIG. 4 and the ringing control unit and a portion of the line circuit shown schematically in FIG. 5;

FIGS. 6, 7 and 8, when arranged as shown in FIG. 10, comprise an additional ringing arrangement disclosed as a second embodiment of this invention, with the subscriber's telephone substation shown schematically in FIG. 6, the ringing control unit and a portion of the line circuit shown schematically in FIG. 7 and the transmission circuits shown by block diagrams in FIG. 8;

In referring to FIGS. 1–8, it may be noted that the elements in FIGS. 4–8 which correspond to the same elements in FIGS. 1–3 have been given the same reference numeral, the first digit of reference numerals indicate the figure in which the elements are principally shown otherwise.

GENERAL DESCRIPTION

Figure 1:
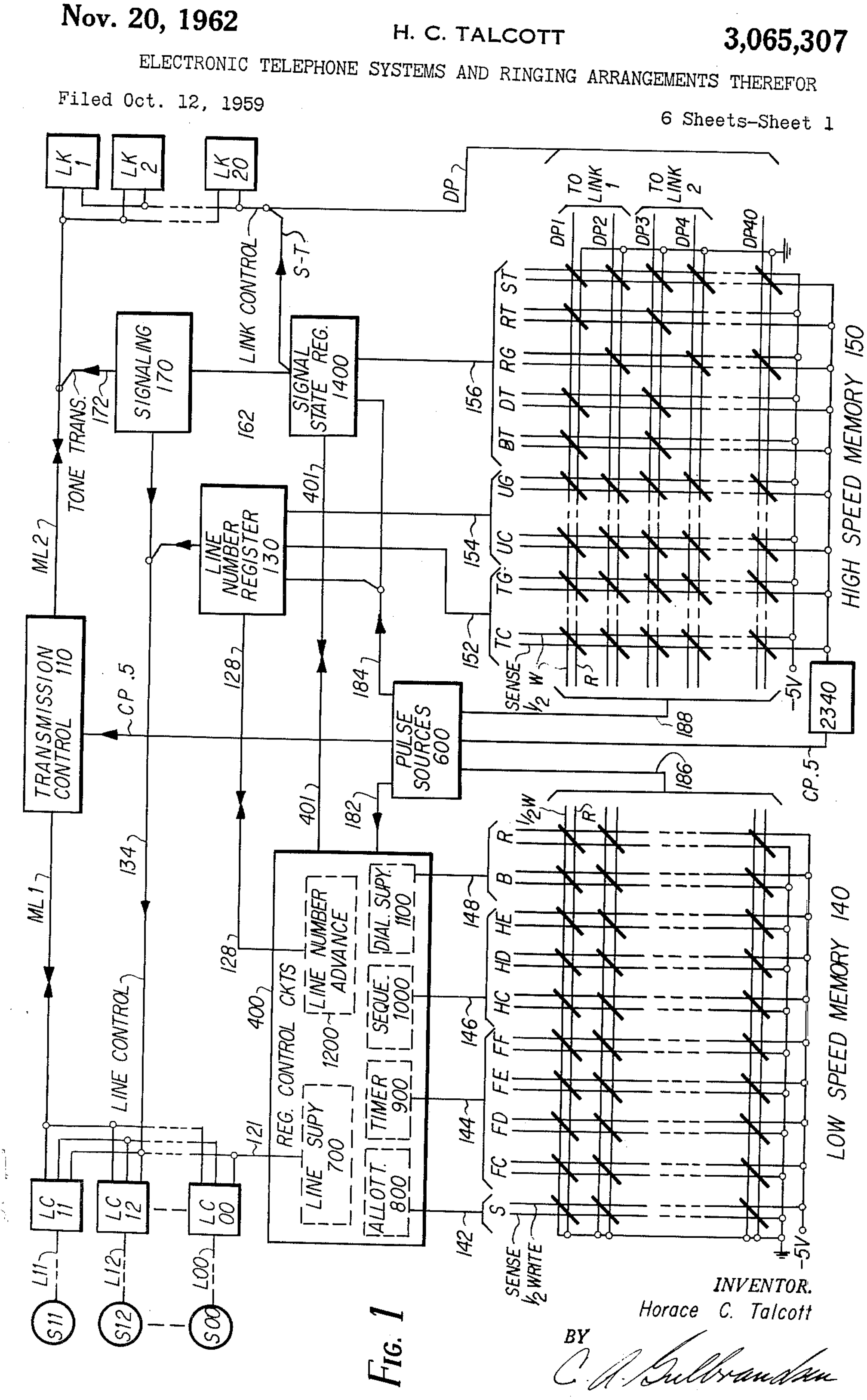

Referring to FIG. 1, the exchange includes 100 line circutis LC11 to LC00 associated with stations S11 to S00, and a plurality of link circuits LK1 to LK20 interconnected by a time division multiplex transmission highway ML1—ML2 having a transmission control unit 110 interposed therein. Any two line circuits may be effectively connected through any link circuit by selectively supplying control pulses to them.

The signalling circuits 170 supply supervisory tones which are transmitted by time division multiplex over line 172 and the highway ML1—ML2 to the line circuits of calling lines. The signalling circuits 170 also supply ringing control signals over conductors in the control line 134 to the line circuits of called lines.

The function of remembering which circuits are interconnected on a time division multiplex basis over highway ML1—ML2 and of supplying control pulses to the selected transmission gates in the appropriate time slots is performed by a high speed memory 150 in conjunction with a line number register 130 and a signal state register 1400. The control pulses are supplied to the line circuits over line 134, to the link circuits over lines DP and S—T, and to the signalling circuits over line 162.

The selective registration in the high speed memory through the line number register 130 and the signal state register 1400 is controlled by the register control circuits 400. These circuits 400 control the line finding function of scanning to find a line which has initiated a call and causing a connection to be established to the calling line; and the connector function of detecting dial pulses from the calling line and causing a connection to be established to the called line. These control circuits 400 are shared by all of the links on a time division basis, using a low speed memory 140 for storage.

The pulse sources 600 comprise pulse generators and distributors for supplying all of the pulses required by the exchange.

Each of the memories 140 and 150 comprises a coordinate array of ferrite cores. In each, the horizontal rows are associated with the links, and the vertical columns are associated with flip-flop type storage devices in the associated units 400, 130, and 1400. Each memory is associated with a separate pulse distributor in the pulse sources 600 to supply pulses to its horizontal conductors in turn. Each horizontal row has a read winding and a ½-write winding threaded through all of the cores of the row, and each vertical column has a sense winding and a ½-write winding. For each of the memories, during each stage of its distributor, a read pulse is supplied through the read winding of the row, causing the state of each core of the row to be transferred by means of the sense windings to the flip-flops. The information in the flip-flops is then utilized and possibly altered by the associated circuitry. A ½-write pulse is applied to the horizontal winding, and coincidently to selected ones of the vertical windings to return the information from the flip-flops to the cores. This is repeated, in turn, for each horizontal row during successive stages of the distributor. The high speed memory comprises cores in five columns TC to TG for registering the tens digit, five columns UC to UG for registering the units digit, and five columns BT, DT, RG, RT, and ST for registering the signal states. Each horizontal row is associated with one time slot of the multiplex transmission. Each stage of the distributor comprises a 0.5-microsecond read pulse followed by a 1.5-microsecond ½-write pulse in a 2-microsecond time slot. The horizontal ½-write windings are connected at one end to the distributor and at the other end over line DP to the link circuits for transmission control. The ½-write windings of the first two rows are connected over leads DP1 and DP2 to link 1 to control the calling party and called party transmission respectively. Successive pairs of horizontal rows are in like manner coupled to successive links, so that each link is permanently associated with two high speed memory rows corresponding to two transmission time slots, one for the calling party and the other for the called party. Also, during each of the 1.5-microsecond pulse intervals, the line number register 130 translates the two-out-of-five code registration of the tens digit to a one-out-of-ten code signal supplied to a conductor in line 134, and the two-out-of-five code of the units digit is translated to a one-out-of-ten code signal supplied to another conductor of line 134, to control the transmission in the line circuit corresponding to this number. At the same time, the signal state register 1400 controls the transmission of supervisory tones to the calling line, ringing to the called line, and switch-through of the link transmission gates, as required.

In the register control circuit 400, the line supervisory circuit 700 receives hookswitch and line-busy information from the line circuits and registers this information in flip-flops for use by the other circuits. The allotter circuit 800 assigns a scanning link to a line which initiates a call. The allotter is associated with the cores in column S of the low speed memory 140 to register whether or not a link is scanning. The timer circuit 900 times the dialing and other hookswitch signals to determine when the sequence state should be changed. The timer uses the cores in columns FC, FD, FE, and FF to register the time interval on a binary basis, separately for each link. The sequence circuit 1000 registers the sequence states of the links, which are: normal, tens dialling, units dialling, busy test, ringing, and conversation. The sequence circuit uses the cores in columns HC, HD, and HE to register these states on a binary basis for each link. The dialling supervisory circuit 1100 is provided to insure that the control circuits do not respond more than once to each dial pulse. This circuit uses the cores in columns B and R, column B being set for the duration of a digit, and R being set only for the duration of a dial pulse. The line-number-advance circuit 1200 supplies advance or rewrite signals to the line number register 130 to control the number registration in the high speed memory 150.

Figure 2:
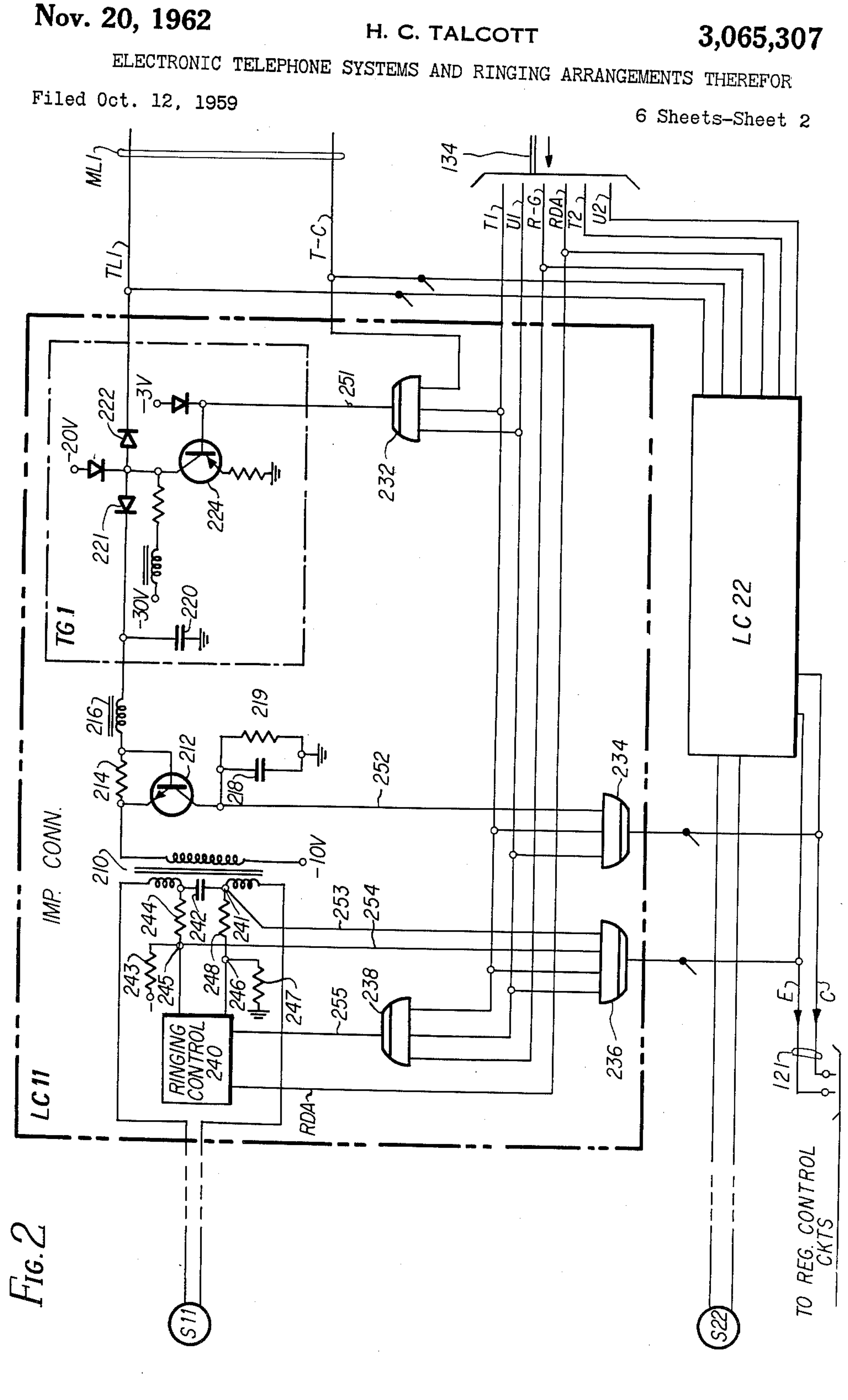

Referring now to FIG. 2, two of the 100 line circuits are shown, with one LC11, shown by a schematic and functional block diagram, and the other LC22, shown as a single block. These line circuits are connected by subscriber lines to their respective stations S11 and S22, in multiple to the multiplex transmission line ML1, to conductors of the control line 134, and in multiple to the line supervision conductors 121. Referring to the connections to the control line 134, the line number pulses are supplied to line circuit LC11 on conductors T1 and U1, and to circuit LC22 on conductors T2 and U2; while for ringing control both line circuits are connected to conductors RG and RDA.

Each line circuit may be considered in two parts, one part relates principally to signalling and supervision circuits, and includes the circuits connected to the subscriber side of transformer 210, along with gates 234, 236, and 238; and the other part relating principally to the audio to multiplex coupling comprises the circuit connected between transformer 210 and the multiplex line ML1 along with gate 232. All of the gates 232, 234, 236, and 238 are controlled by signals from the line number register 130 (FIG. 1) so that they may be activated to produce output signals in the true condition only when there is coincidence on the two line number conductors, which, for line circuit LC11, are T1 and U1. Only one line circuit may be so activated during each two-microsecond time slot.

It has become conventional in electronic telephone systems to supply direct current for the station through resistance coupled to the subscriber line in the line circuit, and to use the variation in voltage drop in this resistance for hookswitch supervision. Here, the negative terminal of the direct current source is connected through resistors 243 and 244 and a winding section of transformer 210 to one of the subscriber line wires, and the grounded positive terminal is connected through resistors 247 and 248 on another winding section of the transformer to the other line wire. To bypass the resistors and direct-current source, a capacitor 242 having low impedance at voice frequencies is connected between the two winding sections of the transformer. Conductors 253 and 254 are connected from junction points 241 and 245, respectively, of the resistors to control the hookswitch supervision gate 236. The conductor 254 is connected to the negative supply side and therefore is normally in a true condition except during ringing. The signal on conductor 253 follows the hookswitch and dial pulse signals to permit pulses to be transmitted to lead E when the line loop is closed, and to interrupt this train of pulses when the line loop opens.

When the line circuit is in use, the capacitor 218 becomes charged and supplies a negative potential to conductor 252, thereby enabling gate 234 to supply a train of pulses to lead C to mark the line busy. The busy-mark-enabling signal on lead 252 continues throughout dialling.

To ring the substation S11, coincident pulses are applied to leads RG, T1 and U1 to enable gate 238 and apply pulses over its output lead 255 to the ringing control unit 240. An interrupter voltage is applied over lead RDA. The ringing control unit 240 responds to these signals to apply a ringing signal to the points 245 and 246 of the direct current feeding resistance network, causing a current flow over the subscriber line to operate a tone ringer (not shown) of the substation S11. The current flow during the ringing signal causes a signal on lead 253 which looks like an off-hook supervisory signal. A ground potential is applied to the lead 254 to block the gate 236 during this ringing interval. However, the interrupter voltage on lead RDA is on for two seconds and off for four seconds, and during the off period the potential on lead 254 returns to the normal negative value so that gate 236 may respond to the hookswitch signal when the subscriber answers.

Voice frequency signals at the transformer 210 are coupled through an impedance converter 212 and a filter which includes inductor 216 to a multiplex transmission gate TG1 which is controlled by pulses from gate 232. The transmission gates of all of the line circuits are connected in common to the end ML1 of the multiplex transmission line.

Figure 3:
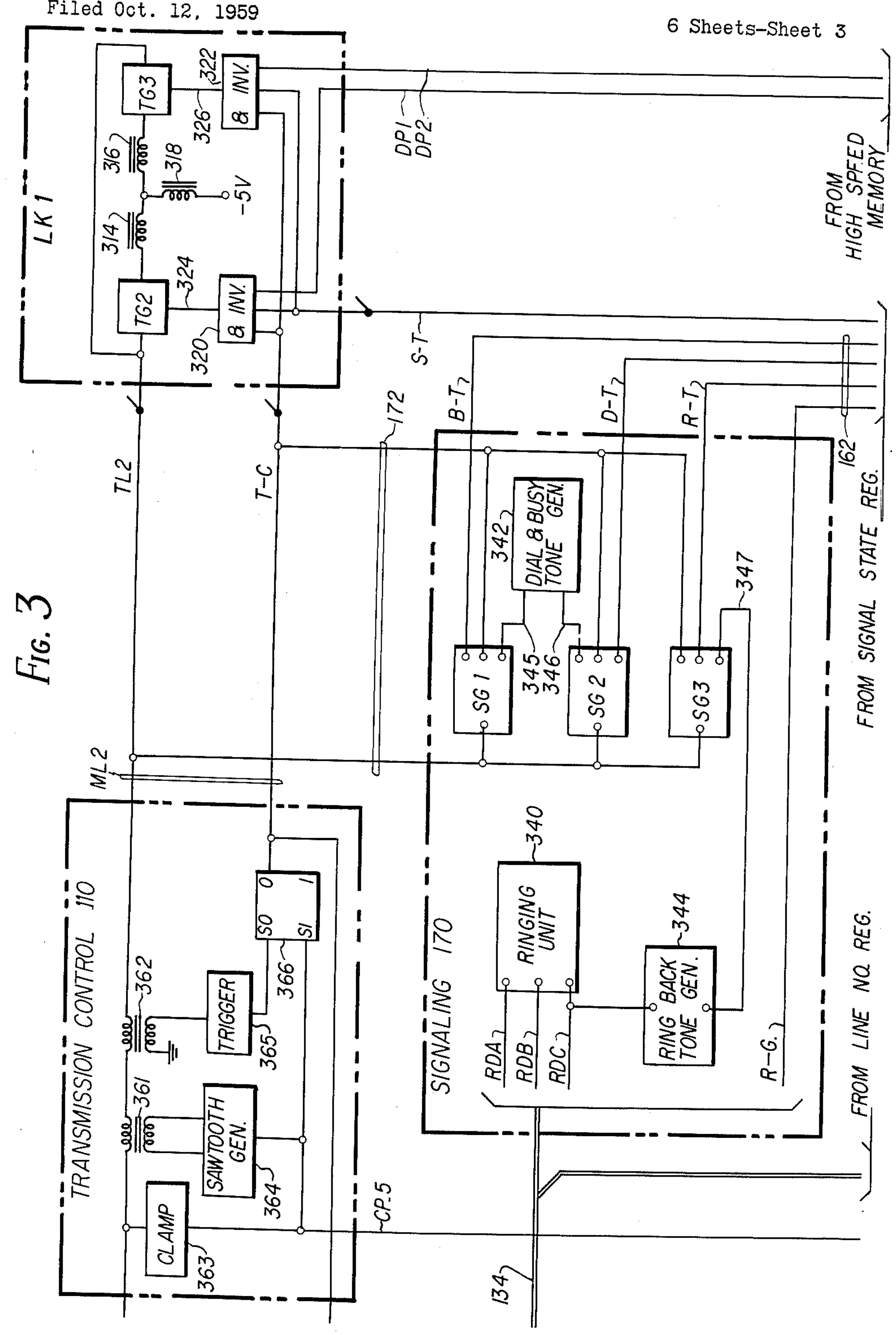

Referring now to FIG. 3, each of the link circuits includes only the circuitry required for multiplex transmission; the register, line finding, dialling, and other switching control circuitry shown in FIG. 1 being shared on a time division multiplex basis by all of the links, with storage in the two memories 140 and 150. One of the link circuits, LK1, is shown in FIG. 3. It comprises two multiplex transmission gates TG2 and TG3, for multiplex connections to the calling and called lines, respectively. These gates are coupled at voice frequency through inductors 314 anod 316, with direct bias supplied through an inductor 318. The calling line transmission gate TG2 is controlled by pulses on lead DP1 supplied through gate 320; and the called line transmission gate is controlled by pulses on DP2 supplied through gate 322, when coincident pulses are supplied over the switch-through conductor S—T. These gate circuits 320 and 322 are of a special type which produce inverted output pulses when all three inputs are true.

A transmission control unit 110, which is inserted in the multiplex line ML1—ML2 includes a clamp circuit 363, a sawtooth generator 364, a trigger circuit 365, and a flip-flop 366. The sawtooth generator and the trigger circuit are connected respectively by transformers 361 and 362 in series with the common highway conductor TL1—TL2. The clamp circuit 363 is provided to reduce cross talk. The sawtooth generator 364, trigger 365, and flip-flop 366 along with a control conductor T—C extending from the flip-flop 366 in multiple to all of the transmission gates in the line and link circuits are used in controlling the multiplex pulses in each time slot, as explained in the above-mentioned United States patent application to Faulkner et al.

Figures 4, 5:
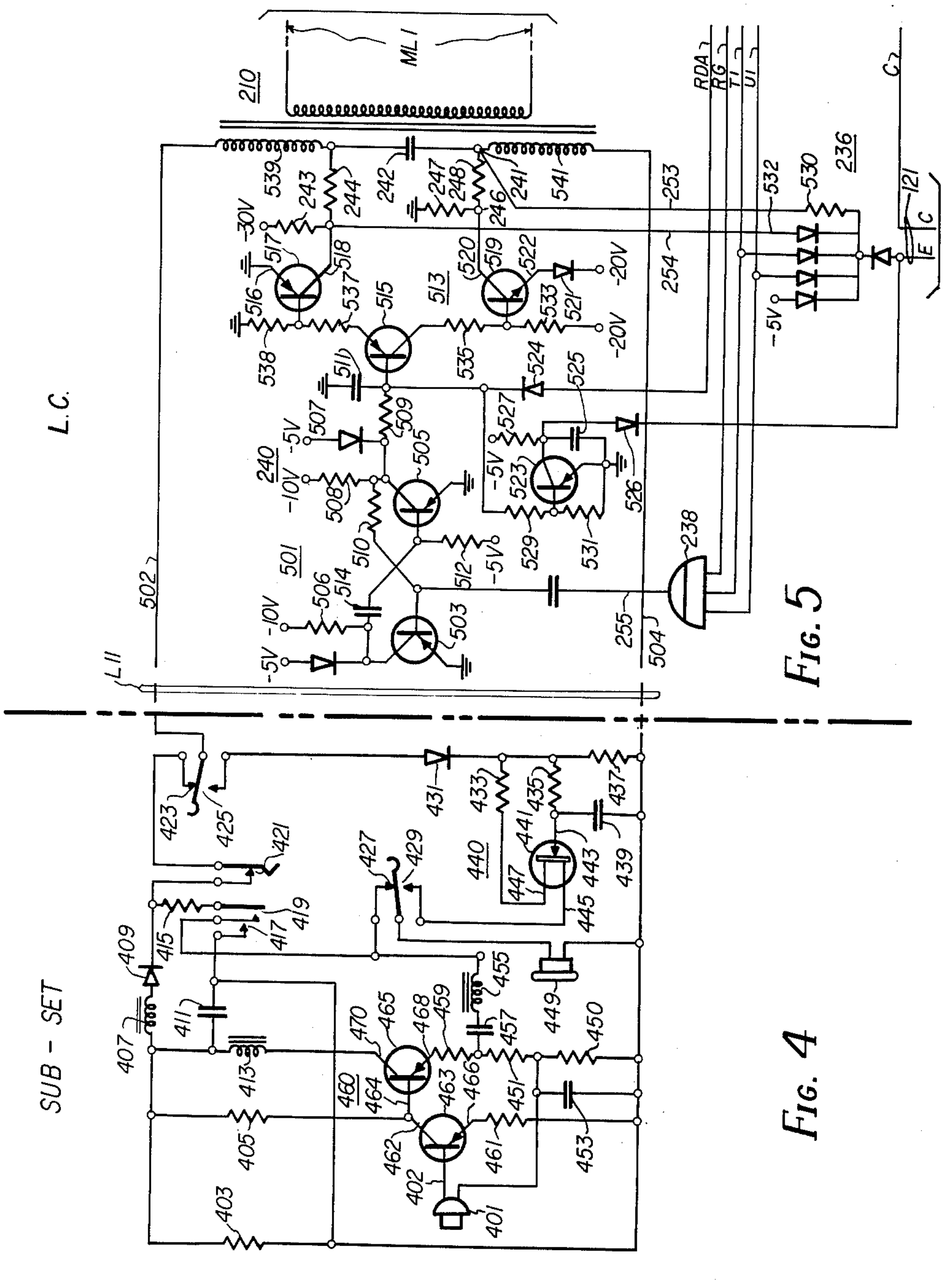

Referring now to FIGS. 4 and 5, a subscriber's substation which may be the substation S11 (FIG. 2) and the ringing control 240 of a line circuit such as LC11 (FIG. 2) is shown in detail. The subscriber's substation (FIG. 4) is shown comprising a handset including a microphone 401 and a receiver 449; a two-stage transistor amplifier 460; a dial equipped with dial impulse springs 421 and shunting springs 417, 419; a switch-hook assembly having contacts 423, 425, 427 and 429; and a tone ringer 440.

The subscriber's substation is shown connected to the central office equipment (FIG. 5) by means of conductors 502 and 504 of the telephone line L11. Only those parts of the line circuit of the central office equipment that are deemed essential for a complete understanding of the invention are shown. Thus, the ringing control 240 (FIG. 2) is shown in detail and only a number of the remaining elements of the line circuit are shown. The ringing control circuit is shown including as its principal components a multiplex integrating network comprising one-shot multivibrator 501 having transistors 503 and 505, resistance 509 and capacitor 511; an interrupter circuit comprising diode rectifier 524; and a static bistable device 513 including transistors 515, 517 and 519.

Assume now for the purpose of illustrating the invention that the subscriber at the substation (FIG. 4) is being called. To ring the subscriber at the substation, coincident pulses derived from the multiplex logic, as explained above, are applied to leads RG, T1 and U1 to enable gate 238 and apply pulses over its output lead 255 to the ringing control 240. These pulses, 1.5 microsecond pulses at a 12.5 kc. repetition rate, are sufficient, one milliampere, to trigger the one-shot multivibrator 501.

Multivibrator 501 comprising transistors 503, 505 has a period of about 50 microseconds so that with an input of 1.5 microsecond pulses at a 12.5 kc. repetition rate the ON ratio of the multivibrator is about 60%. Satisfactory performance is possible for input pulses ranging from 0.5–2 microseconds long, 3–6 volts in amplitude and a maximum repetition rate of 13 kc.

The output of multivibrator 501 is clamped by diode rectifier 507 to a negative 5 volts and charges capacitor 511 through resistance 509. Multivibrator 501 is designed to restore to its normal state before another 12.5 kc. pulse, preferably the next 12.5 kc. pulse, is received over conductor 255, that is, multivibrator 501 having a period of 50 microseconds restores to its normal state during the 80 microsecond interval between the 12.5 kc. pulses over conductor 255. The time constant of the RC circuit including capacitor 511 is long enough that an additional integrating function is performed and a direct-current signal is supplied to transistor 515.

The multiplex integrating network disclosed in this embodiment was found to operate satisfactory using the component values shown below:

Multivibrator 501:

| | | |
|---|---|---|
| Transistor 503, 505 | | 2N524 |
| Resistance 506, 508 | ohms | 2700 |
| Resistance 510 | do | 4700 |
| Resistance 512 | do | 15,000 |
| Capacitance 514 | microfarad | .005 |
| Resistance 509 | ohms | 4700 |
| Capacitance 511 | microfarad | .33 |

Interrupter pulses, derived from the multiplex logic as previously described, appearing on lead RDA interrupts this direct current signal to transistor 515 at a 12 pulse per second rate and for two second ON and four seconds OFF.

Transistor 515 and transistors 517, 519 which control one side of the telephone line L11, respectively, form the static bistable device 513. Transistors 517 and 519 are complementary transistors, that is, transistor 517 is a PNP junction type transistor and transistor 519 is an NPN junction type transistor. Transistors 517, 519 connected, respectively, to the emitter and collector electrodes of transistor 515 are both rendered conductive simultaneously when transistor 515 is rendered conductive.

During the OFF intervals, or during the idle periods when the substation is not being used, transistors 517 and 519 are biased non-conductive and normal polarities, negative battery and ground, are applied to conductors 502 and 504, respectively. This may be traced as follows: negative battery, resistances 243 and 244, winding 539, conductor 502, hookswitch contact 425, diode rectifier 431, resistance 437, conductor 504, resistances 248 and 247, to ground.

It may be noted, however, that during the conditions described above, no direct current flows over this path since diode rectifier 431 (FIG. 4) is back biased thereby restricting the current flow.

When transistor 515 of the static bistable device 513 is caused to saturate, an amplified current is generated through the base-emitter resistances of transistors 517, 519 causing them to saturate. Transistor 517 when it saturates effectively switches the potential applied to conductor 502 from negative battery to ground, and transistor 519 simultaneously effectively switches the potential applied to conductor 504 from ground to negative battery; thus reversing the direction of direct current flow from the source over the line by switching the potentials applied to both sides of the telephone line L11. This may be traced as follows: ground, emitter 516 of transistor 517, collector 518 of transistor 517, resistance 244, winding 539, conductor 502 of the telephone line L11 to the substation (FIG. 4), hookswitch contact 425, diode rectifier 431, resistance 437, conductor 504 of the telephone line L11 to the line circuit (FIG. 5), winding 541, resistance 248, collector 520 and emitter 522 of transistor 519, diode rectifier 521, to negative battery.

Diode rectifier 431 (FIG. 4) is now biased in the proper direction thus the direct current flows over the loop circuit traced above to the tone ringer 440 in the subscriber's substation (FIG. 4).

Resistances 533 and 538 reduce the bias due to the leakage of transistors 517 and 519 thus holding them effectively cut off. Diode rectifier 521 provides an additional self-bias on transistor 519 to reduce the current during the OFF interval which would result from the leakage current of transistor 515 being amplified by transistor 519. For very small input currents, the resistance of diode rectifier 521 is very high, thus providing degeneration to transistor 519 as an amplifier. For input currents of a substantial larger value (.50 microampere), diode rectifier 521 has sufficient forward bias to reduce its resistance to a relatively low value.

During the ON interval when the direct current flows through the loop circuit traced above, the voltage drop across resistances 247 and 248 causes a signal on lead 253 which looks like an off-hook supervisory signal to enable the loop supervisory gate 236 through resistance 530. Diode rectifier 532 conductive at this time due to the interrupter pulses appearing on lead RDA and diode rectifier 526 conductive due to the signal resulting from the voltage drop across resistance 243, inhibit the loop supervisory gate 236 during this ringing ON interval. Resistance 244 partially isolates capacitor 242 from output of transistor 517 so that the inhibiting potential to diode rectifier 532 can rise faster than the enabling signal through resistance 530, thus preventing any transient signal getting through the gate. Resistance 248 and diode rectifier 521 help by increasing the time constant of transistor 519 and capacitor 242.

The interrupter pulses on lead RDA, as previously explained, interrupt the direct-current input signal to transistor 515 to cause the direction of direct current flow to be reversed at a twelve pulse per second rate and for two seconds ON and four seconds OFF. At the end of a twelve pulse per second pulse, the collector-to-emitter paths of transistors 517 and 519 are virtually opened, and the potential at the collectors 518 and 520 return towards a negative potential and ground, respectively. At this time capacitor 242 has to reverse its charge through the series resistance of resistances 243, 244, 247 and 248. The RC time constant is such that during the transient discharge of capacitor 242 there is still a sufficient potential available to enable gate 236 during the interval between these pulses. Since there is now no direct current flow through the loop previously traced, the inhibit potential due to the voltage drop across resistance 243 is no longer available through diode rectifier 532 thus another source must be provided to cover the re-charge time of capacitor 242.

Transistor 523 and its associated circuitry perform this function. The interrupter pulses on lead RDA are amplified by transistor 523 to discharge capacitor 525. Capacitor 525 inhibits the loop supervisory gate 236 through diode rectifier 526 for a time interval after the ringing pulse goes off, depending upon the time for capacitor 525 to re-charge back to a negative potential through resistances 527 and 530 in multiple. The time constant of resistance 527, 530 and capacitor 525 is sufficient to cover the decay of the gate enabling potential down to a negative value thus assuring that gate 236 is not enabled at this time. Considering the tolerances of the various components and the sensitivity of the loop supervisory detection equipment this arrangement provides an adequate margin of safety.

To further illustrate the action of the supervisory gate 236 and the disabling networks assume now that the subscriber at the substation (FIG. 2) answers the call. If the call is answered during the four second OFF interval, direct current flow from the negative potential through resistances 243, 244, winding 539, over the line, through winding 541, resistances 248, 247, to ground. Capacitor 242 is charged through the loop resistances 243, 244, 247 and 248 and the subset resistances. The resulting voltage drop across resistances 247 and 248 provides the loop supervisory signal to enable the loop supervisory gate 236 through resistance 530. When gate 236 is enabled, ringing is cut-off and the call is switched through as previously described. Diode rectifiers 526 and 532 are blocking at this time, so do not affect the operation of the gate.

If the call is answered during the two second ON interval the loop supervisory gate 236 is inhibited by the inhibit pulse through diode rectifier 526 until capacitor 525 has sufficient time to re-charge to a negative potential. Once capacitor 525 has re-charged the loop supervisory gate is enabled and the call proceeds as described above.

It may be noted that the values of the above-mentioned components entering into the inhibit function and the design of the components of the multiplex logic may be advantageously chosen such that ringing cut-off and switch-through may occur during either interval, that is, during the interval between the 12 pulse per second pulses which occur during the ON interval or during the OFF interval.

The tone ringer 440 in the substation (FIG. 4) comprises a unijunction transistor 441 connected in a conventional relaxation type of oscillator circuit. An oscillator of this type is disclosed in the General Electric Transistor Manual, third edition, page 59. Reference is made to this manual for the complete description of its operation. Unijunction transistor 441 has base electrode 447 connected by way of resistance 433, diode rectifier 431 and hookswitch contact 425 to conductor 502 of the telephone line L11; base electrode 445 connected by way of hookswitch contact 429 and receiver 449 to conductor 504 of telephone line L11; and emitter electrode 443 also connected to conductor 504 by way of resistances 435 and 437. Capacitor 439 in parallel with resistance 435 and 437 provides a low impedance bypass path.

When the hookswitch is operated (substation idle) receiver 449 is connected to the output of the oscillator and acts as the transducer for the tone ringer. In signalling the substation, the interrupter pulses on lead RDA, as previously stated, interrupt the D.C. input signal to transistor 515 (FIG. 5) to cause transistors 517 and 519 to reverse the direction of direct current flow from the source over the line at a 12 pulse per second rate and for 2 seconds ON and 4 seconds OFF. When the line polarity is such that ground is extended to the substation (FIG. 4) by way of conductor 504, diode rectifier 431 is biased in the forward direction and direct current flows in the loop path traced above. Tone ringer 440 by means of the biasing arrangement comprising resistances 433, 435, 437 and receiver 449 is triggered to produce a saw-tooth shaped waveform at about 800 cycles per second. Receiver 449 reproduces this audio tone to attract the called subscriber at the substation.

The particular values of the components used for the relaxation oscillator which were found to provide proper operation of this arrangement are as follows:

| | | |
|---|---|---|
| Unijunction transistor | | 2N493 |
| Resistance 433 | ohms | 330 |
| Resistance 435 | ohms | 1500 |
| Resistance 437 | ohms | 10,000 |
| Capacitor 439 | microfarad | .68 |

It may be observed that when the hookswitch is operated (substation idle) the receiver 449 acts as the transducer for the tone ringer 440; and when a call is answered, or the subscriber places a call, the hookswitch contact 427 transfers the receiver 449 to the transmission circuit.

The transmission circuit is a modified arrangement of the transmission circuit disclosed by A. H. Faulkner, United States Patent 2,885,483, issued May 5, 1959. The changes in this transmission circuit were necessary in order for the inventor to use the receiver as the transducer for both the transmission circuit and the tone ringer; a standard low impedance receiver, i.e. 150 ohms, is used since the receiver is shared with the tone ringer which required the lower impedance.

The transmission circuit employs a magnetic microphone 401 driving a two-stage transistor amplifier 460; a magnetic microphone is used to provide a better signal-to-noise ratio and the two-stage transistor amplifier is necessary since the output level of such transmitters is relatively low.

The two-stage transistor amplifier 460 has two common emitter stages comprising transistors 463, 465 with both D.C. and A.C. degeneration for stabilization.

Resistors 450, 451, and 459 which are all of a relatively low value form a voltage divider arrangement which serves to provide the electrodes of transistors 463, 465 with the necessary bias potentials. Resistor 450 of this arrangement is bypassed by a large-value electrolytic condenser 453 to eliminate negative A.C. feedback. There is, however, substantial negative D.C. feedback to stabilize the operating points of transistor 463, 465. The un-by-passed emitter resistance 461 raises the input impedance to match the impedance of magnetic microphone 401.

The automatic stabilizing action of this arrangement may be explained as follows: if the bias potential at collector 462 and base 464 tends to drift towards a more negative value the second stage emitter current will tend to rise, and since a portion of this current flows through resistances 450 and 451 from bottom to top as viewed in FIG. 5, the potential at first stage base 402 is driven more negative. The resultant tendency of the first stage collector current to rise will tend to increase the voltage drop across load resistance 405, thereby tending to shift the potential at the junction of resistances 450, 451 back in the positive direction.

Speech signals generated by magnetic microphone 401 are impressed between the base 402 and emitter 466 of the first stage transistor by way of electrolytic bypass capacitor 453 which shunts the D.C. feedback resistor 450 for speech signals to avoid loss of gain in the voice frequency range. The resulting speech currents flowing in the signal input circuit appear in amplified form in the signal output circuit of the first stage transistor which extends from collector 462 to emitter 466 and includes high-value load resistance 405 and condenser 453.

The above-mentioned output circuit of the first stage transistor 463 is shunted by the signal input path of the second stage transistor 465 which path includes base 464, emitter 468, resistances 451 and 459, and electrolytic bypass condenser 453.

The amplified signals appear in the output circuit of second stage transistor 465 which circuit may be traced as follows: collector 470, emitter 468, windings 413 and 407, diode rectifier 409, hookswitch contact 423, conductor 502, winding 539, capacitor 242, winding 541, conductor 504, resistances 450, 451, 459.

It may be observed that the load on second stage transistor is divided between collector 470 and emitter 468 in such a way that the transmitted signal is split into two components which can be balanced out in the receiver 449; thus providing an anti-sidetone function. This is as follows: transistor 465 operates essentially as a cathode follower to develop one signal at the junction of resistances 450 and 451, or one side of the receiver 449, an equal and opposite signal is magnetically coupled from the collector winding 413 to the receiver winding 455. As these two voltages just mentioned balance each other the outgoing speech signals do not appear across receiver 449.

During receiving, the speech signal currents flowing through winding 407 induce signal voltages in both windings 413 and 455. Since the collector resistance of the second stage transistor 465 is very high there is substantially no load on winding 413 and most of the power goes into receiver 449 because of the low impedance presented by the emitter generator; the balance being dissipated in the collector winding 413.

Figures 6, 7, 9, 10:
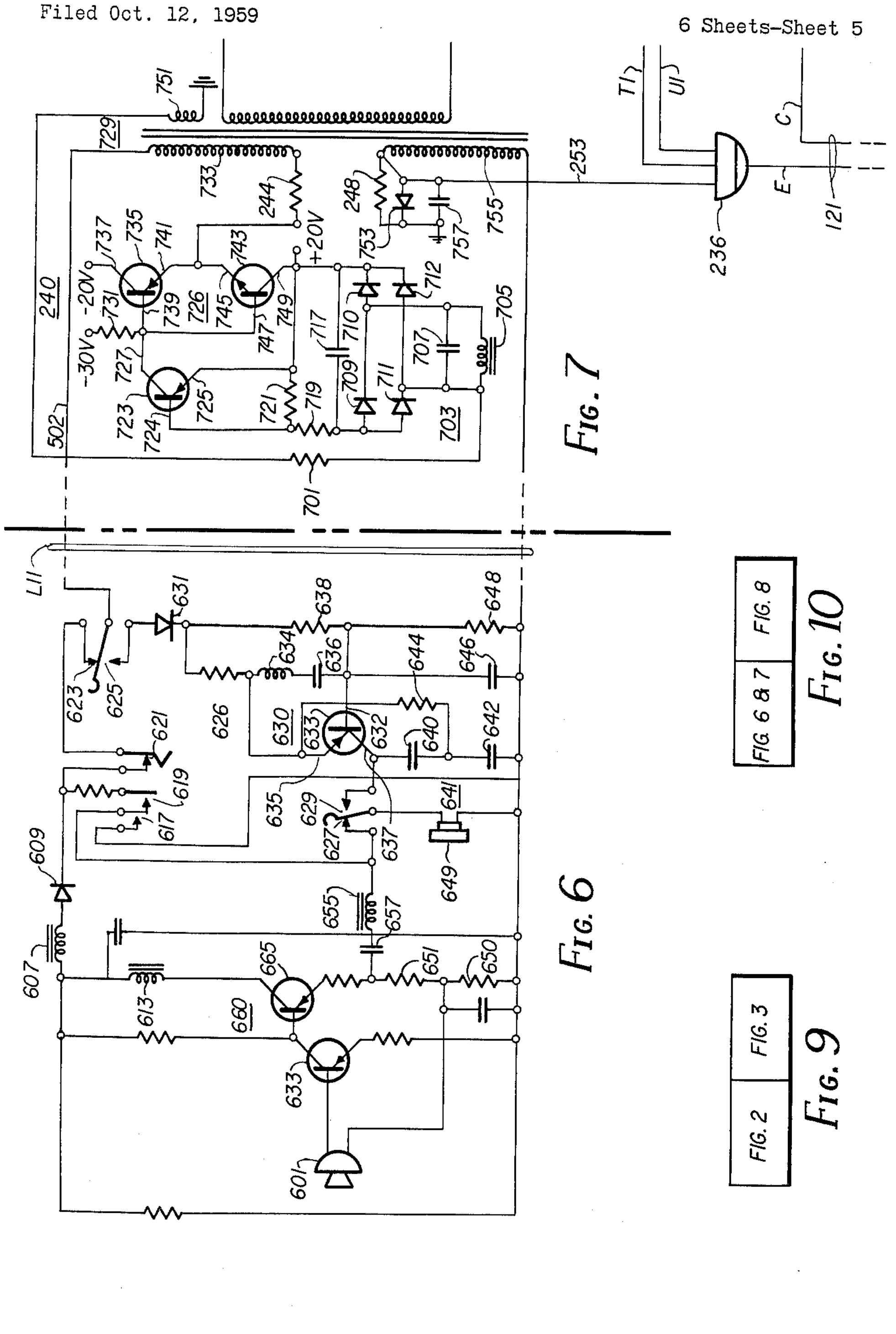
FIG. 9 shows the arrangement of FIGS. 2 and 3.
FIG. 10 shows the arrangement of FIGS. 6, 7 and 8.
Figure 8:
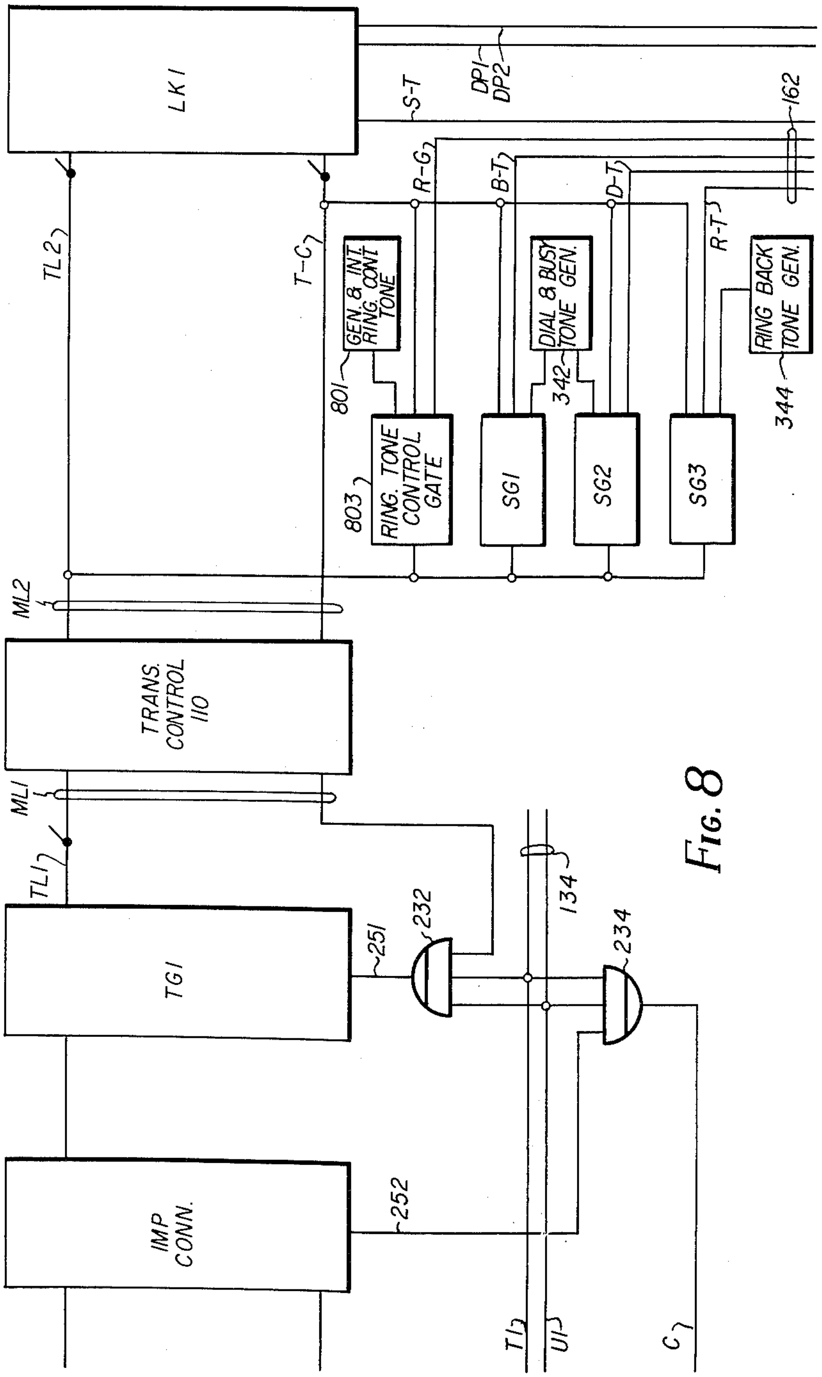

FIGS. 6, 7 and 8 show a ringing arrangement disclosed as a second embodiment of this invention. The ringing arrangement shown is a modification of the ringing arrangement of FIGS. 4 and 5. The subscriber's substation shown in FIG. 6 is similar to the substation shown in FIG. 4 except for the tone ringer which has been replaced by a self-quenching Colpitts type oscillator. The ringing control unit 240 of the central office line circuit (FIG. 7) and the central office common equipment (FIG. 8) has been modified to detect ringing control signals transmitted over the common multiplex transmission highway ML1 and ML2.

The operation of this modified arrangement is briefly as follows: a ringing control signal is generated by the generator and interrupter ring control tone circuit 801 (FIG. 8) and gated by the ring tone control gate 803 to the common multiplex highway ML1 and ML2; this ringing control signal is transmitted over the common multiplex transmission highway in the voice frequency range to the line circuit (FIG. 7) associated with the subscriber's substation (FIG. 6); the ringing control unit 240 of the line circuit detects and rectifies this ringing control signal to cause the direction of direct current flow from the source over the line to be reversed; the tone ringer at the substation (FIG. 6) responds to the reverse direction of direct current flow to generate a ringing tone signal to attract the called subscriber at the substation.

Referring first to FIG. 8 which shows the central office common equipment. It may be observed that the central office equipment is the same as shown in FIGS. 2 and 3 with the following exceptions: a generator and interrupter ring control tone circuit 801 and a ring tone control gate 803 have been added while the ringing interrupter 340 (FIG. 3), the interrupter leads RDA, RDB and RDC and the gate 238 (FIG. 2) have been eliminated.

The generator and interrupter ring control circuit 801 is arranged to generate and interrupt a ringing control tone signal in the voice-frequency range. The details of this circuit are not disclosed since any generator capable of generating a signal in the voice-frequency range and interrupting the signal produced at a ringing cycle of two seconds ON and four seconds OFF may be used.

The ringing tone control gate 803 is a gate similar to the gate SG1 disclosed in the above-identified United States patent application to Faulkner et al.

To illustrate the operation, assume that the subscriber at substation (FIG. 6) is called. Pulses derived from the multiplex logic again appear on the RG, T1 and U1 leads as previously explained. The pulses on the RG lead gate the ring tone control gate 803 to apply the voice-frequency ring tone control signals produced by the generator and interrupter ring tone control circuit to the common multiplex highway ML2 and ML1; the pulses on leads T1 and U1 enable gate 232 which controls the multiplex transmission gate TG1 to allow transmission in the time slot assigned to the called subscriber at substation (FIG. 6). These ringing tone control signals are then transmitted over the common multiplex highway to the line circuit (FIG. 7) associated with the called substation.

The line circuit (FIG. 7) includes a coupling transformer 729 similar to that in the line circuit (FIG. 5). An additional winding 751 has, however, been added to couple the voice-frequency ring tone control signals to the ring control unit 240. The signals induced in winding 751 are coupled through resistance 701 to a filter arrangement 703 comprising the parallel-resonant combination of inductor 705 and capacitor 707 arranged to suppress all frequencies except that of the ringing tone control signal. Resistance 701 is selected large enough to eliminate any interference of the filter arrangement upon the transmission circuit.

A rectifier bridge 709—712 connected in the output of filter arrangement 703 rectifies the ringing tone control signal passed by the filter arrangement to charge capacitor 717 bridged across one diagonal of the rectifier bridge. As capacitor 717 becomes charged a small current is caused to flow through resistance 721, base 724 and emitter 725 of transistor 723 of the static bistable device 726. This current causes transistor 723 to saturate.

The static bistable device comprising transistors 723, 735 and 743 and their associated biasing components is arranged to control the polarity of the potential applied to one side of the telephone line L11 while the other side remains at a common potential. The direction of direct current flow from the source over the line is thereby reversed when the ring tone control signals are received.

Under normal conditions when the substation (FIG. 6) is idle, a negative bias is supplied to the bases 739 and 747 of transistors 735 and 743, respectively. The two transistors are complementary, that is, transistor 735 is a PNP junction transistor and transistor 743 is a NPN junction transistor, thus transistor 735 is normally conductive or in the ON condition. Direct current flows as follows: negative battery, through the collector 737 and emitter 741 of transistor 735, resistance 244, winding 733, conductor 502 of telephone line L11 to the substation (FIG. 6), hookswitch contact 625, diode rectifier 631, resistances 638 and 648, conductor 504 of telephone line L11, winding 755, resistance 248, to ground. It may be observed, however, that no current flows in the ringing circuit under normal conditions since diode rectifier 631 (FIG. 6) is reversed biased.

When capacitor 717 becomes charged, as previously described, causing transistor 723 to saturate, bases 739 and 747 of transistors 735 and 743 are biased positive. Transistor 735 is turned OFF and transistor 743 is turned ON. With transistor 743 ON, a positive potential is now connected to the same side line and the direction of direct current flow from the source over the line is reversed. Diode rectifier 631 is now properly biased and direct current flows over the loop circuit traced above.

It may also be observed that diode rectifier 753 is also biased in the proper direction and current flows through this diode rectifier to ground. Diode rectifier 753 across resistance 248 is included to reduce the resistance in the line loop during ringing.

It may be noted that the transistor inhibit circuit 523 (FIG. 5) and the inhibit lead 254 (FIG. 5) have been eliminated in this disclosed embodiment. In the disclosed arrangement (FIG. 7) it is not necessary to provide special means guarding against false loop supervisory signals since capacitor 757 (FIG. 7) is now connected from the upper terminal of winding 755 to ground rather than bridging windings 539 and 541 as capacitor 242 in FIG. 5; thus the transient discharge of capacitor 242 which previously occurred during the reversals does not occur and the false indications need not be guarded against.

Loop supervision is again provided by means of the supervisory signal appearing on lead 253 due to the voltage drop across resistance 248. When the called subscriber at substation (FIG. 6) answers and direct current flows over the line in the normal direction, diode rectifier 753 is back biased and current flows through resistance 248 resulting in the above-mentioned voltage drop to enable loop supervisory gate 236.

The subscriber's substation (FIG. 6) employs the same transmission circuit as the substation (FIG. 4) and reference may be made to the previous disclosure for the explanation of this arrangement. The tone ringer 513 (FIG. 5) has been replaced, however, with the tone ringer 630 having a self-quenching Colpitts type oscillator circuit comprising as its principal components a transistor 633 having a base electrode 632, an emitter electrode 635 and a collector electrode 637, a parallel-resonant circuit 641 including series capacitors 640, 642 and receiver 649, a choke coil 634 and a capacitor 636 providing the quenching operation and a biasing arrangement including resistances 638 and 648. An oscillator of this type is disclosed in the article titled "Superregenerative Oscillator" in the book "Transistor Circuits and Applications" by J. M. Carroll, pages 104 and 105.

The operation of the tone ringer is as follows: when transistor 723 (FIG. 7) is rendered conductive, as previously described, to cause transistor 743 to turn ON, the direction of direct current flow is reversed; diode rectifier 631 is biased in the forward direction allowing current to flow in the loop circuit previously traced; current flowing through the voltage divider resistances 638 and 648 provides the proper bias for transistor 633 and renders it conductive. When transistor 633 is rendered conductive, operation of the oscillator is essentially as described in the above-mentioned book by J. M. Carroll and reference is made to that book for the description of the operation.

It may be observed that receiver 649 forms part of the parallel-resonant circuit 641 forming a tuned circuit controlling the frequency of the oscillator. The component values are chosen so as to provide the loudest and most penetrating sound; in this particular disclosure the values were so chosen to produce a 2300 cycles per second signal. Receiver 649 also functions as the transducer for the oscillator thus reproduces this 2300 cycle per second signal to signal the subscriber at the substation. It may also be noted that receiver 649 is transferred to the transmission circuit when hookswitch contact 627 is operated.

The quenching operation is obtained by means of choke coil 634 and capacitor 636 controlling the base to emitter voltage as described in the above-mentioned book by J. M. Carroll. The component values were again chosen so that the quenching rate is approximately 12 pulses per second; this rate was determined experimentally by listening tests and was found to be the most satisfactory and acceptable to a subscriber.

Accordingly, the period of a quenching cycle is much greater than the resonant period of tuned parallel-resonant circuit 641, and the generation of oscillations is quenched at a rate which is much less than the resonant frequency of circuit 641. The fact that the quenching rate of the oscillator could be established at 12 pulses per second eliminated the need for the interruptions by the multiplex logic as in the previously described ringing arrangement (FIGS. 4 and 5). The ringing cycle of 2 seconds ON and 4 seconds OFF is achieved by means of the generator and interrupter ring control tone circuit 801 (FIG. 8) thus there is no variation in the tone ringing signal of either arrangement.

Referring now to the above-mentioned third, and preferred embodiment of this invention. In this embodiment the ring control unit 440 (FIG. 7) and the central office equipment (FIG. 8) are arranged to perform the necessary operations in conjunction with the substation (FIG. 4). As was previously explained, the relaxation oscillator tone ringer 440 (FIG. 4) comprising the unijunction transistor 441 is triggered by reversing the direction of direct current flow over the line at a 12 pulse per second rate and with a ringing cycle of 2 seconds ON and 4 seconds OFF. The oscillator is interrupted at the 12 pulse per second rate to give the tone signal a characteristic "chirp" which is more distinct to the called subscriber at the substation. It is necessary that these interruptions occur at the line circuit since the oscillator is not a self-quenching type oscillator as disclosed in FIG. 6.

The generator and interrupter ring control tone 801 (FIG. 8) of the second embodiment is therefore arranged to interrupt, in addition to the 2 seconds ON—4 seconds OFF ringing cycle, the ringing control tone signal at the 12 pulse per second rate as described in the first embodiment of this invention.

Alternately, a ringing interrupter similar to the ringing interrupter 340 (FIG. 3) may be incorporated and used to trigger the input to transistor 723 at the left hand terminal of resistance 721 in the manner described.

With the central office equipment arrangement in this manner, the ringing tone control signal is transmitted over the common multiplex transmission highway ML1, ML2 in the voice frequency range as previously described. The signal, however, is interrupted at the 12 pulse per second rate and with a ringing cycle of 2 seconds ON and 4 seconds OFF.

The ringing tone control signals are induced in winding 751, coupled through resistance 701 to the input of filter network 703 and rectified by rectifier bridge 709–712 to trigger transistor 723 in the manner previously described.

Since the ring tone control signals are now interrupted, transistor 723 is triggered ON and OFF at the above-mentioned rate; transistors 735 and 743 are also alternately triggered OFF and ON, respectively, in the manner previously described, and cause the direction of direct current flow over the line to be reversed at the same rate. Tone ringer 440 responds to these reversals to generate a tone ringing signal as before and receiver 449 reproduces these signals to signal the called subscriber at the substation.

The advantage achieved by this arrangement is that immediate ring cut-off and switch-through operation is available without the need of special provisions to guard against false indications. Capacitor 757 extending from the upper terminal of winding 755 to ground is immediately discharged to ground during the reversals hence is not charged as previously described. If the subscriber at the substation answers the call during the interval between a 12 pulse per second pulse, a loop supervisory signal immediately appears on lead 253 to enable the loop supervisory gate 236. The same is, of course, true if the subscriber should answer during the Off interval of the ringing cycle.

While only certain embodiments of the invention have been illustrated and described it is to be understood that numerous modifications in the details of arrangement may be resorted to without departing from the true spirit and scope of the invention as defined in the appended claims.

What is claimed is:

1. In a telephone system, a line, a subscriber telephone substation connected to said line, a central office, a line circuit terminating said line in said central office and having a source of direct current connected thereto, a signalling arrangement comprising means in said line circuit operative when said line circuit is seized by an incoming call to reverse the direction of direct current flow from said source over said line, signal indicating means at said substation including an oscillator circuit responsive to the operation of said current reversing means for producing a tone ringing signal, an electroacoustic transducer connected to the output of said oscillator for reproducing said tone ringing signal to signal the called subscriber at said substation, first ringing interrupter means for causing said reversing means to periodically reverse the direction of said current flow at a relatively low rate and thereby cause said oscillator to interrupt said tone ringing at said low rate and second ringing interrupter means for causing said reversing means to reverse the direction of said current flow at a rate which is high as compared to the rate of said first ringing interrupter and low as compared to the frequency of said oscillator, the corresponding interruptions of said oscillator giving said tone ringing signal a distinct chirping characteristic.

2. In a telephone system, a line, a subscriber telephone substation connected to said line, a central office, a line circuit terminating said line in said central office and having sources of direct current potential connected thereto and a signalling arrangement, comprising means in said line circuit including a static bistable device for causing the direction of said direct current to be reversed when said line circuit is seized by an incoming call, signal indicating means at said substation responsive to said current reversing means to signal the called subscriber at said substation, said static bistable device comprising a first static switch including a first transistor having a base, emitter and collector electrodes, a second static switch comprising a second transistor of opposite conductivity to said first transistor and including base, emitter and collector electrodes, a first impedance element connected between the negative terminal of said source and one side of said line, a second impedance element connected between the ground terminal of said source and the other side of said line, said first transistor emitter electrode connected to said grounded terminal of said source and its collector electrode connected to said junction of said first impedance element of said line, said second transistor emitter electrode connected to said negative terminal of said source and its collector electrode connected to said junction point of said second impedance element further comprising control means simultaneously operating said static switches to cause said connections from said line and the two terminals of said source to be effectively reversed, said base electrodes of said first and said second transistor both connected to said control means, said control means simultaneously rendering said first and second transistors conductive to cause said connection from said line of said source to be effectively reversed by said transistors.

3. In a telephone system, a line, a subscriber telephone substation connected to said line, a central office, a line circuit terminating said line at said central office having sources of direct current potential connected thereto, and a signalling arrangement comprising means in said line circuit including a static bistable device for causing the direction of said current to be reversed when said line circuit is seized by an incoming call, signal indicating means at said substation responsive to said current reversing means to signal a called subscriber at said substation, further including one side of said line connected to a common potential, said static bistable device comprising a static switch for switching the other side of said line from a potential higher than said common potential to a potential lower than said common potetial, and control means for operating said static switch thereby reversing the direction of current flow over said line, said static switch comprising two transistors of opposite conductivity type, one of which is normally conductive while the other is nonconductive, and wherein said control means comprises a control transistor which is normally nonconductive, said transistors each having base, emitter and collector electrodes, said control transistor controlling the conductivity of said first mentioned transistor to alternately cause one or the other of said two transistors to be conducting.

4. In a time division mutliplex telephone system, a line, a subscriber telephone substation connected to said line, a central office, a line circuit terminating said line in said central office and having sources of direct current potential connected thereto, and a signalling arrangement, said signalling arrangement comprising means in said line circuit including a static bistable device for causing the direction of said direct current to be reversed on said line circuit is seized by an incoming call, multiplex integrating means for deriving a direct current signal for controlling said static bistable device; interrupter means connected to said multiplex integrating means and connected to said static bistable device, said interrupter means interrupting said direct current signal of said multiplex integrating means to said static bistable device, and signal indicating means at said substation responsive to said current reversing means to signal the called subscriber at said substation.

5. In a time division multiplex telephone system having a common multiplex transmission highway, a line, a subscriber telephone substation connected to said line, a central office, a line circuit terminating said line and said central office having sources of direct current potential connected thereto, a signalling arrangement comprising means in said line circuit including a static bistable device for causing the direction of said current to be reversed when said line circuit is seized by an incoming call, a multiplex ring tone control signal transmitted over said common multiplex transmission highway, means for coupling said ring tone control signal to said static bistable device including means for detecting said ring tone control signal, means connected to said detector means for rectifying said ring tone control signal, and means connected between the output of said rectifier means and the input of said static bistable device responsive to said rectified ring tone control signal to cause said static bistable device to be rendered operative, and signal indicating means at said substation responsive to said current reversing means to signal the called subscriber at said substation.

6. In a telephone system, the combination as claimed in claim 2, wherein said control means comprises a control transistor having base, emitter and collector electrodes, said base electrodes of said first and second transistors connected respectively to said emitter and said collector electrodes of said control transistor, and comprises means for applying control signals to the base of said control transistor whereby said first and second transistors are simultaneously rendered conductive.

References Cited in the file of this patent

UNITED STATES PATENTS

| | | |
|---|---|---|
| 2,666,812 | Kircher | Jan. 19, 1954 |
| 2,802,902 | Elliott et al. | Aug. 13, 1957 |
| 2,824,175 | Meacham et al. | Feb. 18, 1958 |
| 2,854,516 | Faulkner | Sept. 30, 1958 |
| 2,863,952 | Scowcroft et al. | Dec. 9, 1958 |
| 3,012,102 | Hodges | Dec. 5, 1961 |